(12) United States Patent
Chen et al.

(10) Patent No.: US 8,538,615 B2
(45) Date of Patent: Sep. 17, 2013

(54) SMART ELECTRICAL WHEEL FOR ELECTRICAL BIKES

(75) Inventors: Hsin-Chih Chen, Taiwan (CN); Shu-Hsun Chiang, Taiwan (CN); Paul Daniel Faucher, Escondido, CA (US); Ya-Fang Ke, Taiwan (CN); David Meyer, San Diego, CA (US); Nitish Swarup, Sunnyvale, CA (US); Hsing-Han Tsai, Taiwan (CN); Juan Bautista Belon, San Diego, CA (US); Chia-Wen Chang, Taiwan (CN)

(73) Assignee: Belon Engineering Inc., San Diego, CA (US)

( * ) Notice: Subject to any disclaimer, the term of this patent is extended or adjusted under 35 U.S.C. 154(b) by 221 days.

(21) Appl. No.: 12/989,408

(22) PCT Filed: Feb. 6, 2010

(86) PCT No.: PCT/US2010/023424
§ 371 (c)(1),
(2), (4) Date: Oct. 22, 2010

(87) PCT Pub. No.: WO2010/091323
PCT Pub. Date: Aug. 12, 2010

(65) Prior Publication Data
US 2011/0278909 A1 Nov. 17, 2011

Related U.S. Application Data

(60) Provisional application No. 61/206,909, filed on Feb. 6, 2009.

(51) Int. Cl.
*B60L 11/00* (2006.01)
*B62M 6/25* (2010.01)
*B62K 11/00* (2013.01)

(52) U.S. Cl.
USPC .......................... 701/22; 180/206.5; 180/220

(58) Field of Classification Search
USPC ....................... 701/22, 110; 180/220, 206.05
See application file for complete search history.

(56) References Cited

U.S. PATENT DOCUMENTS

| 5,732,786 A | 3/1998 | Fujigaki | |
| 6,320,336 B1* | 11/2001 | Eguchi | 318/139 |
| 6,446,745 B1* | 9/2002 | Lee et al. | 180/206.2 |

(Continued)

FOREIGN PATENT DOCUMENTS

| EP | 1820727 A1 | 8/2007 |
| JP | 7172377 A | 7/1995 |

(Continued)

*Primary Examiner* — Fadey Jabr
*Assistant Examiner* — Thomas Ingram
(74) *Attorney, Agent, or Firm* — TechLaw LLP

(57) ABSTRACT

A wheel assembly having a motor attached to a hub within the wheel assembly such that the motor powers the wheel assembly to rotate about an axle once the motor receives a predetermined amount of power. A battery system is configured to deliver power to said motor, the battery system is arranged to rotate with the wheel assembly. A sensor system within the wheel assembly provides data related to velocity and angle of orientation of the assembly. A control system within the wheel assembly receives data related to velocity and angle of orientation of the wheel assembly from the sensor system, with the control system having at least one output to from the battery system indicative of an amount of power that is delivered to the motor.

18 Claims, 5 Drawing Sheets

(56) References Cited

U.S. PATENT DOCUMENTS

| | | |
|---|---|---|
| 6,640,609 B1 | 11/2003 | Nadkarni et al. |
| 2003/0047369 A1 | 3/2003 | Katagiri et al. |
| 2005/0284226 A1 | 12/2005 | Boda et al. |
| 2006/0076828 A1 | 4/2006 | Lu et al. |
| 2008/0071436 A1* | 3/2008 | Dube et al. ............ 701/22 |
| 2009/0082914 A1* | 3/2009 | Yuan ............ 701/22 |

FOREIGN PATENT DOCUMENTS

| | | |
|---|---|---|
| JP | 2008044409 A | 2/2008 |
| WO | 2004050385 A2 | 6/2004 |
| WO | WO 2004050385 A2 * | 6/2004 |
| WO | WO 2009070064 A1 * | 6/2009 |

* cited by examiner

SMART ELECTRICAL WHEEL FOR ELECTRICAL BIKES

BACKGROUND OF THE INVENTION

1. Field of the Invention

The present invention pertains to hybrid bicycles and, more particularly, to retrofitting conventional bicycles to convert them to hybrid bicycles.

2. Description of the Prior Art

Numerous electrically powered bicycles and hybrid bicycles currently exist within the marketplace. Hybrid as used herein refers to bicycles or vehicles that are powered using multiple power sources. A hybrid bicycle, as used herein, refers to bicycles that have an electrical power source plus at least one other power source.

Kits are currently available that can be used to retrofit conventional, manually powered bicycles into either electrically powered or hybrid powered bicycles. These kits typically provide electrically powered wheels or parts that convert conventional wheels into electrically powered wheels. Currently available kits have hardware distributed throughout various parts of the bike.

An example of one type of currently available kit for the retrofitting of conventional bicycles to create electrical or hybrid bicycles, requires users to assemble batteries somewhere on the bicycle frame and to install controllers of some type on the handle bar so the user can control the electrical power to the motor. The assembly of these kits takes time and some customers are discouraged with the time needed as well as the technical expertise and tools required to complete the assembly.

There remains a need for assemblies that can retrofit conventional bicycles to create hybrid, or electrical bicycles, that do not require significant user assembly or have numerous parts distributed on various areas of the bicycle.

SUMMARY OF THE INVENTION

Embodiments described herein discuss the design of an electrical bicycle wheel and algorithms used to control electrical bicycle wheel.

Other embodiments disclose algorithms and combination of sensors within an electrical wheel that control power to an electric or hybrid bicycle without the need for user input.

Additional embodiments described herein discuss an electrical bicycle wheel having all the hardware components incorporated inside a front wheel assembly.

Still additional embodiments described herein discuss an electrical bicycle wheel that employs an accelerometer to control the electrical power of the bicycle Other embodiments detail a wheel that is a single assembly that can be used to retrofit bicycles to create a hybrid bicycle.

Another embodiment provides an electrical front wheel assembly containing all the hardware necessary to retrofit a conventional bicycle to create a hybrid bicycle without any tools for conventional bicycles that have a quick release skewer.

DETAILED DESCRIPTION

Figure 1:
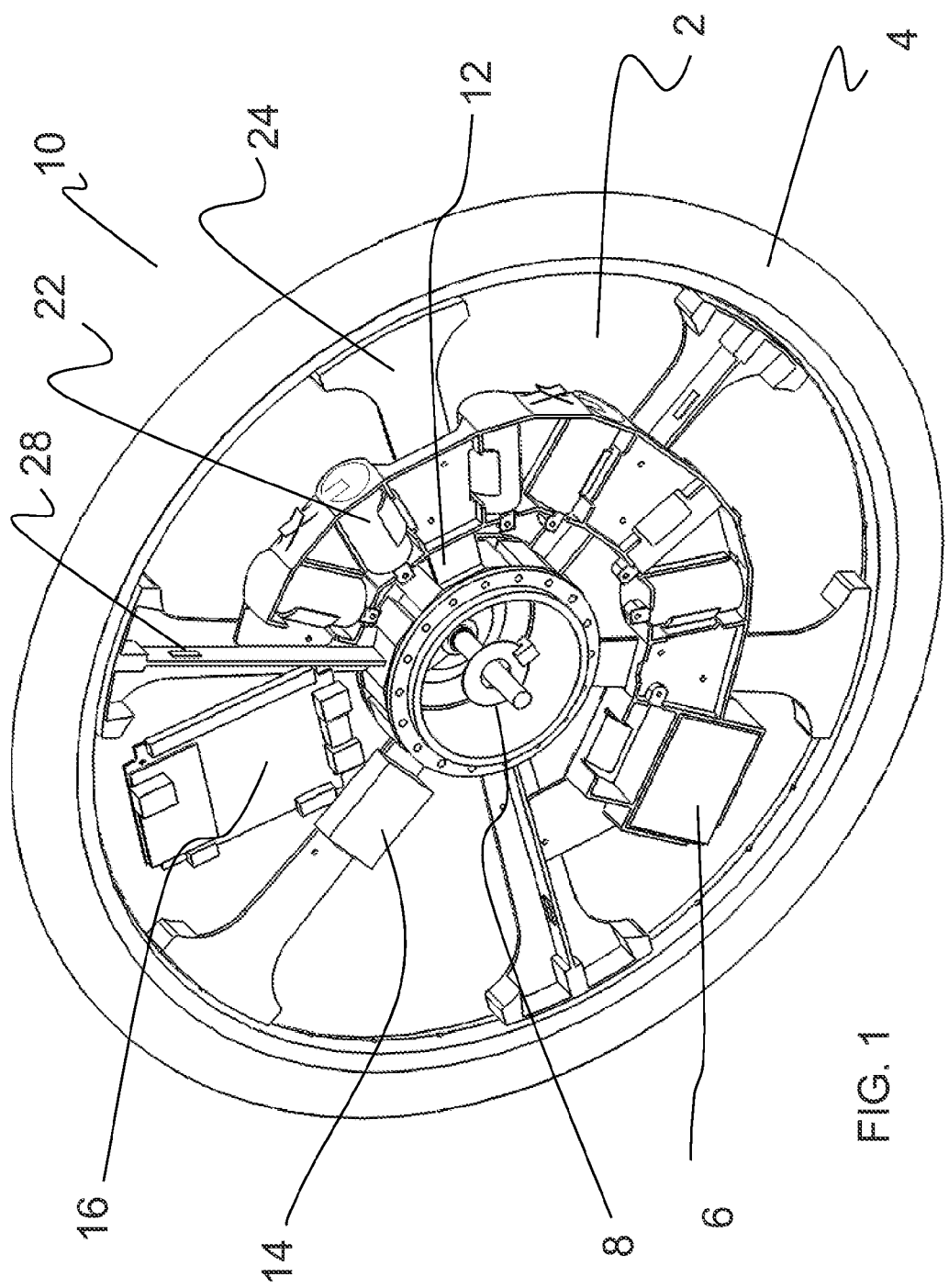
FIG. 1 is a cut away, perspective view of an embodiment for an electrical bicycle wheel.

FIG. 1 is an illustration of an embodiment for a bicycle front wheel assembly 10 that provides power using only elements contained within the wheel assembly 10. Wheel assembly 10 is powered by motor 12 that mounted around central axle 8. The wheel assembly has tire 4 and cover 2. Cover 2 exists on both sides of wheel assembly 10 but is removed from the viewing side to allow the interior portions of the wheel assembly to be seen.

The wheel assembly 10 rotates about axle 8. An example of a motor that can be used for motor assembly 12 within wheel assembly 10 is a 24 volt, 250 watt motor manufactured by Jia-Yu.

In an embodiment, a control mechanism is supplied outside the wheel assembly 10 to allow a user to increase or power supplied by wheel assembly 10. The user will use the control mechanism to command power to the motor 12.

In another embodiment, there is no user control mechanism and the wheel assembly is provided with sufficient intelligence to operate without user control or input. The electrical wheel assembly 10 is designed with sufficient intelligence such that no user input is required. Accordingly, no user control mechanism, either on the handle bar or anywhere on the bicycle, is required. The electronics within the wheel assembly 10 makes decisions regarding the amount of power to be supplied to the electrical motor.

In embodiments that do not require user input or control, algorithms and combinations of sensors in the wheel assembly 10 are employed to control voltages applied to the motor 12.

In another embodiment employs wheel assembly 10 as a replacement of a conventional bicycle front wheel. The wheel assembly 10 is a smart electrical wheel designs that makes retrofitting on a conventional bicycle with wheel assembly 10 a trivial task. In this embodiment, the smart electrical wheel assembly 10 contains all the necessary hardware to provide power to drive a bicycle. Included within the wheel assembly 10 are batteries, controllers, cables incorporated inside. The wheel assembly is placed in use by simply replacing the front wheel on conventional bicycle with wheel assembly 10. The conventional bicycle retrofitted with wheel assembly 10 then becomes a hybrid bicycle with manner power applied in a conventional manner and electric power applied through wheel assembly 10.

In an embodiment, electrical wheel assembly 10 may include multiple types of sensors. These sensor types may include accelerometers, encoders in or associated with the motor 12 that measures the angular position of the motor 12 with respect to the ground, and strain gages in one or more spokes 24.

Power for motor 12 is provided by battery assembly 22. Battery assembly 22 is an assembly that contains connections for several batteries. In an embodiment, the battery assembly can rotate with wheel assembly 10. The battery assembly 22 illustrated in FIG. 1 contains batteries dispersed circumferentially around axle 8 such that the battery assembly 22 can rotate with wheel assembly 10. Controller 6 receives signals from main circuit board 16 regarding the amount of power the motor 12 should receive from battery system 22. A DC power connection (not shown) is provided to recharge the battery system 22.

An embodiment for battery assembly 22 employs 20 D-size, rechargeable batteries. An example of a rechargeable battery that can be used are D-size, rechargeable batteries from NEXcell®. It should be noted that numerous types of batteries can be used within battery assembly 22 and battery assemblies can be made that contain more or fewer than 20 batteries. It should be noted that additional assemblies for providing battery power are envisioned that do not contain batteries dispersed circumferentially around axle 8 or that do not rotate with wheel assembly 10.

The wheel assembly 10 illustrated in FIG. 1 may employ various sensors. One type of sensor that may be employed is an accelerometer 14 that provides sensor data indicative of the motion of the wheel assembly. An example of a satisfactory accelerometer 14 is the Freescale KIT3376MMA7341L that provides a three axis analog output. Accelerometer 14 is attached to one of spokes 24 and rotates with wheel assembly 10. Analog sensor data from accelerometer 14 is input into main circuit board 16. The analog sensor data from accelerometer 14 can be converted to digital sensor data on main circuit board 16. While accelerometer 14 rotates with the Wheel assembly 10, embodiments are envisioned having accelerometers that do not rotate with wheel assembly 10 but instead remain in a fixed position relative to axle 8.

An example of an available circuit board that can provide the functions required by main circuit board 16 is the RABBIT BL4S200, or the like. In an embodiment using the RABBIT BL4S200, the processor contained thereon can perform a Fast Fourier Transform (FFT) of the digital sensor data from the accelerometer 14. Embodiments can have the processor perform mathematical operations on the digital sensor data from accelerometer 14 in real time. The processor on a RABBIT BL4S200 is sufficiently fast to perform these operations in real time.

Other embodiments can implement, a Look Up Table (LUT) within memory contained in the main circuit board 16. The RABBIT BL4S200 contains flash memory that can provide LUT functionality. The sensor data from the accelerometer 14 can be converted from time domain to frequency domain by an FFT and placed within an LUT. The LUT can be read to provide the angle at which wheel assembly 10 currently exists.

Another sensor that may be used within wheel assembly 10 is an encoder 18 that functions to provide data relative to the linear velocity of the wheel assembly 10. Encoder 18 may be a rotary encoder having one part that does not rotate with wheel assembly 10 and another part that does rotate with wheel assembly 10. To determine the linear velocity of rotating wheel assembly 10, the movement of the part that rotates with wheel assembly 10 is measured with respect to the part that does not rotate with wheel assembly 10. An example of such an encoder is the Avago HEDS-9701.

The Avago HEDS-9701 contains a Light Emitting Diode (LED) having emitted light collimated into a parallel beam by a collimating lens that is positioned in the path of the light. Opposite the LED is a set of photodetectors and associated the signal processing circuitry that produces digital waveforms from light received from the LED. In an embodiment, the LED, collimating lens, photodetectors and signal processing circuitry rotate with wheel assembly 10 and the codewheel remains in a fixed spatial relationship to axle 8.

The codewheel is positioned between the LED and the photodetectors. The codewheel does not rotate with the wheel assembly 10. Therefore, the relative movement of codewheel with respect to the LED and the photodetectors causes the light beam to be interrupted by the pattern of spaces and bars on the codewheel. The photodiodes detect these interruptions that are arranged in a pattern. The photodetectors are spaced such that a light period on one pair of photodetectors corresponds to a dark period on the adjacent pair of photodetectors. The outputs from the photodiodes are input into comparators within the signal processing circuitry that produce final outputs for channels A and B. The outputs of channel A and channel B are digital signals that are 90 degrees out of phase, or otherwise stated said to be in quadrature. The counting of number of phases of the spinning codewheel leads to a determination of the velocity of wheel assembly 10. These signals for output channels A and B are input into main circuit board 16. The outputs from the A and B channels can be placed within a LUT as will be discussed in further detail below. Other embodiments can use the outputs from channels A and B directly in mathematical calculations without employing a LUT on main circuit board 16 or place them into memory on main circuit board 16 and use them directly.

The rotary encoder described above is an example of one specific type of rotary encoder and it will be readily apparent to those skilled in the art that other rotary encoders could be used. Additionally, other types of encoders rather than rotary encoders may be used to determine the velocity of a bike employing wheel assembly 10.

In one embodiment, a configuration of sensors employs an encoder and an accelerometer.

The accelerometer 14 can be positioned such that is rotates with wheel assembly 10 to measure acceleration intensity. The value of acceleration is read by the electronics together with the encoder 18 reading. The encoder 18 reading can be initialized by artificially setting to zero when the wheel is in a flat surface. Once initialized, the electronics keeps track of the encoder position and the accelerometer readings. In an embodiment, the encoder 18 position and accelerometer 14 readings are used by the processor on main circuit board 16 to calculate the speed and position, respectively. The phase angle of the accelerometer can be calculated to provide a measure of the slope. The electronics can also calculate the encoder 18 position change is units of time, which is a measure of the bicycle speed. These two values, of slope and speed can be compared in real time by the processor on main circuit board 16 to provide information to generate the corresponding voltage needed by the motor to compensate for the slope and to compensate for the drag due to velocity.

Other embodiments that employ lookup tables can retrieve data previously calculated and placed in look up tables, are compare the values contained in look up tables during operation of wheel assembly 10. The resulting comparisons provide information to generate the corresponding voltage needed by the motor to compensate for the slope and to compensate for the drag due to velocity.

As stated above, the algorithm requires that the slope initially be set to zero. Therefore, the user has to calibrate the unit on a flat surface. In this type of embodiment, the initial slope is calculated when the bicycle starts (and is assumed to be on level ground) is stored and subtracted from the phase angle calculated on subsequent revolutions after initialization. Alternatively, an initialization reset mechanism can be incorporated into wheel assembly 10 allowing a user to indicate a starting point. By incorporating one of more strain gage sensors 28, this initialization step can be eliminated.

In an embodiment, one or more strain gage sensors 28 are located on spokes 24. In embodiments using strain gage sensors 28 located on each spoke 24, the output from the strain gage sensors 28 reaches a maximum once the end of spoke near the tire is closest to the ground resulting in the maximum amount of strain on that spoke 24. The resulting FFT of the strain gages together with the accelerometer FFT will give the slope without any calibration.

In embodiments using a single strain gage sensor 28, the electronics associated with the strain gage sensor 28 can calculate a centroid of the stress value to identify the placement angle of the wheel assembly.

In an embodiment, a wheatstone bridge amplifier is associated with each strain gage sensor 28. In other embodiments, multiple strain gage sensor 28 will provide multiple resistance values within a wheatstone bridge circuit.

Figure 2:
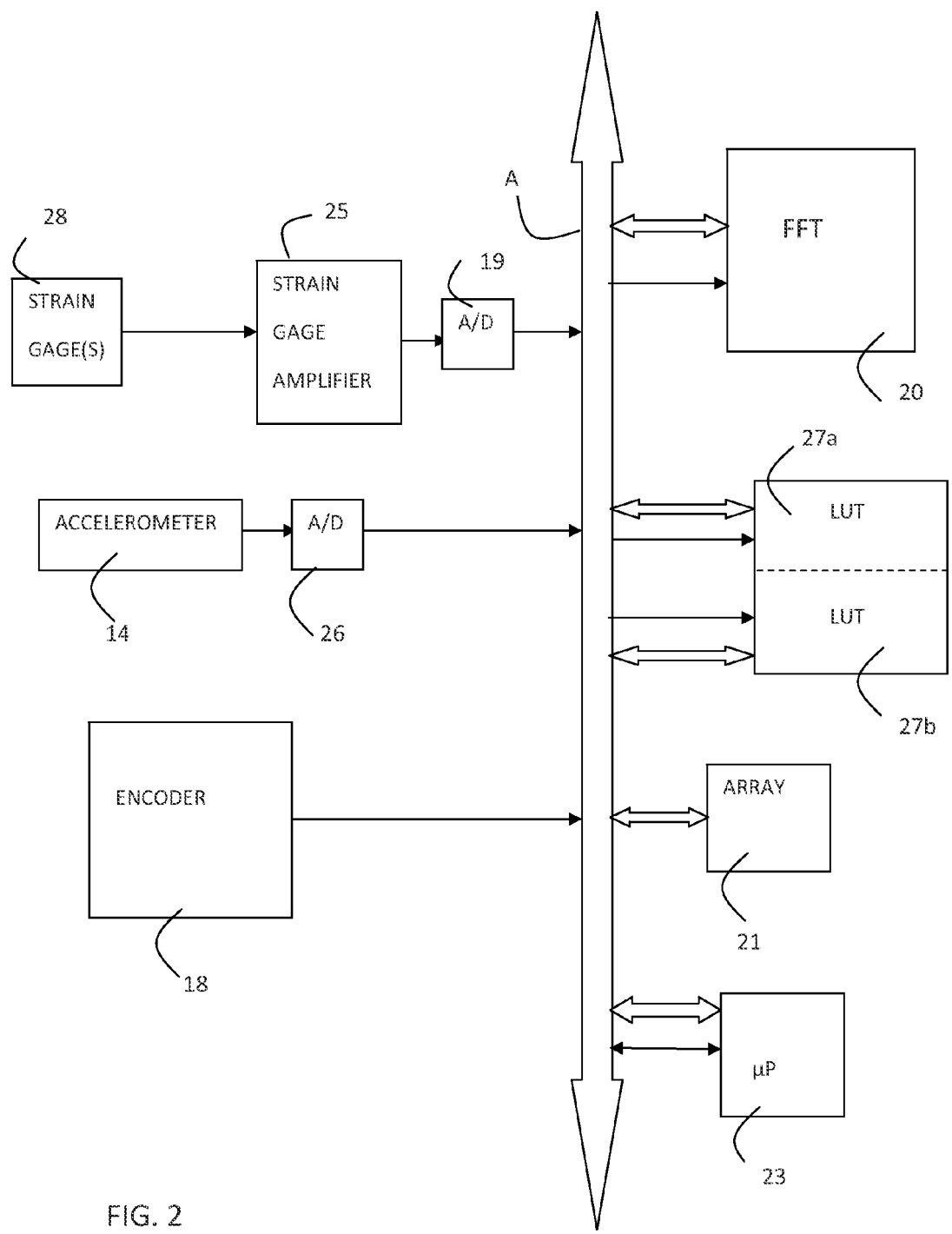
FIG. 2 a functional block diagram for the determination of output voltage applied to the wheel motor.

FIG. 2 is an illustration of a functional block diagram for an embodiment of wheel assembly 10. The embodiment shown in FIG. 2 is a wheel assembly 10 that can operate without the need of any user control and hence requires no user interface. The embodiment in FIG. 2 the wheel assembly provides electronics allowing the user to simply pedal or brake. The wheel assembly 10 has multiple sensors that provide sufficient intelligence to read the slope and the speed of the bicycle.

The sensors in the embodiment for wheel assembly 10 illustrated in FIG. 2 include one or more strain gages 28. The strain gages 28 provide a simple and effective initialization for the wheel assembly 10. Each strain gage 28 can have a wheatstone bridge amplifier circuit (full, half or quarter) associated with it to provide an indication that the resistance value of that strain gage has changed. A strain gage amplifier 25 can be used to provide excitation for a wheatstone bridge amplifier circuit and to amplify the strain gage reading.

For embodiments using multiple strain gages on spokes of wheel assembly 10, the force exerted by the ground will create a maximum reading for the strain gage 28 on the spoke 24 closest to ground. These embodiments can place a strain gage 28 on each spoke 28 to create intelligence that will allow the processor 23 on the main circuit board to know the position of the wheel assembly.

An embodiment includes measuring the slope angle with respect to the gravity by using a single strain gage 28. The strain gage 28 can be configured to measure stress in multiple directions. The centroid of the stress can then be used to locate position of the wheel assembly 10. Embodiments employing a single strain gage 28 can be used to determine a centroid of stress levels and in a manner that informs processor 23 on the main circuit board of the position of the wheel assembly 10.

Analog to Digital convertor (A/D) 19 converts strain gage data into digital form where it is place on to buss A. The strain gage data can then be used to by the processor 23.

Encoder 18 provides quadrature signals indicative of the movement of wheel assembly 10 around axle 8. The signals from encoder 18 can, in an embodiment, be digital signals. Therefore, analog to digital conversion is not required. These quadrature signals are placed onto bus A and used by processor 23 to calculate the linear velocity at which wheel assembly 10 is moving.

In other embodiment, the quadrature signals may be placed into memory on main circuit board 16 and read out by the processor to calculate velocity. A Look Up Table (LUT) 27a via bus A could also be used for this purpose.

The accelerometer 14 measures forces exerted through movement of wheel assembly 10 as well as forces due to gravity. The accelerometer 14 will produces voltage outputs responsive to force exerted on the accelerometer 14. These voltage outputs are the data received and converted to digital form by A/D 26. The digitized version of the accelerometer data is then made available to Bus A where it is placed into array 21. The data from array 18 may be read out periodically by processor 23 and a Fast Fourier transform may be made using FFT 20.

In another embodiment, the Fast Fourier Transform of the data from accelerometer 14 is placed into Look Up Table (LUT) 27b via bus A. The data located in LUT 27b can be used by the processor.

Array 21 and FFT 20 can be located in memory on main circuit board 16. Array 21 is an allocation of memory for storage purposes. Instead of array 21 being used as a data structure, other data structure such as a linked list could also be used. FFT 20 a program that can reside within memory on main circuit board 16.

In embodiments employing LUTs 27a, 27b, these can be located in flash memory on main circuit board 16.

The Fast Fourier Transform of data from accelerometer represents the slope. During initialization, subtracting the phase angle for the strain gages from the accelerometer phase angle (e.g. $\phi_A - \phi_S$) gives the sloped angle at which the wheel assembly 10 exits.

In an embodiment, the electronics can employ look up tables (LUT). These look up tables 27a, 27b may contain accelerometer data as a function of slope angle and data from strain gages.

In an embodiment, the computer reads the two LUTs 27a, 27b depending on the values of the sensors and combines the values from the LUTs 27a, 27b to produce a value for the output voltage that is to be output from the battery assembly 22 to the motor 12. In this manner the processor on the main circuit board 16 can compensate for slope and drag force due the bicycles velocity making the bicycle easier and more enjoyable to ride.

Other embodiments may make calculations directly from the sensor and do not require the use of look up tables.

Figure 3:
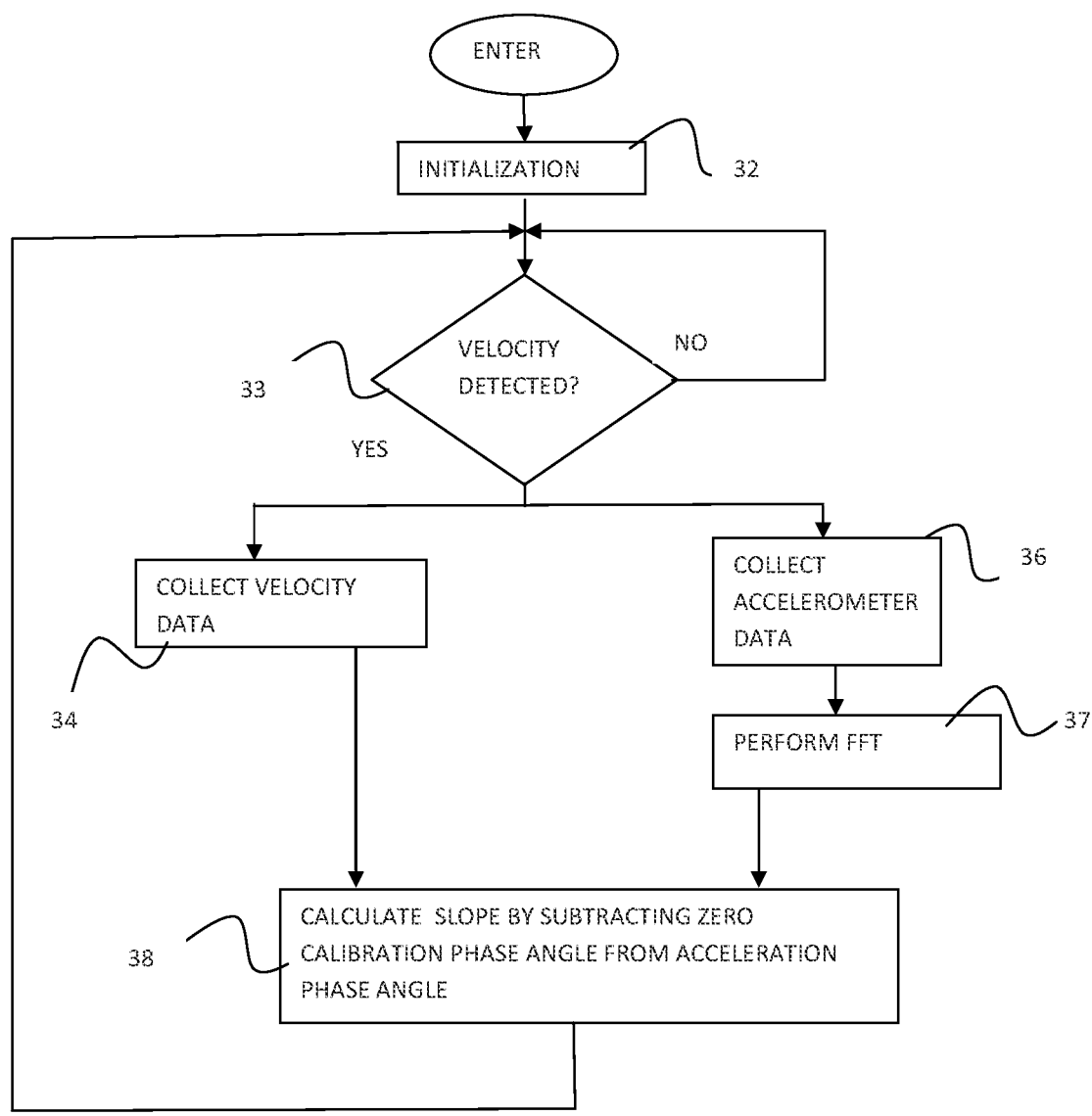
FIG. 3 is a flow chart of the operation for the electrical bicycle wheel shown in FIG. 1.

FIG. 3 is a flow diagram showing the basic functioning of the calculation of slope, velocity and phase angle. The routine is entered once wheel assembly 10 is being used. The system for wheel assembly goes through an initialization 32 wherein system resources are acquired as needed and the various parts are initialized. Velocity Detected 33 waits for sufficient movement in the wheel assembly before reading any sensor data. In this manner there is 0 volts applied to motor 12 while the bicycle is at a stand still position. Once velocity is detected, parallel branches are taken. Collect Velocity Data 34 is similar to the flow diagram in FIG. 4 and Collect Accelerometer Data is similar to the flow diagram in FIG. 5, may be performed in parallel.

The linear speed of the wheel assembly 10 is determined by Calculate Velocity Data 34. The phase angle for the accelerometer data is determined by Perform FFT 36. The Calculate Slope By Subtracting Velocity Phase Angle From Accelerometer Phase Angle 38 give the angle of inclination to help determine the output voltage that should be delivered from the battery assembly 22 to the motor 12 by controller 6.

The routine of FIG. 3 then returns to the post initialization state and begins the routine again.

In an embodiment, an Angle Calculation can be determined to provide the desired output voltage from the battery assembly 22 to the motor 12 at any given point in time while the bicycle is being ridden. The output voltage should be higher if the bicycle is climbing a hill, and lower if it is travelling on flat ground or going down a hill.

Additionally, the output voltage should be higher if the bicycle is travelling at higher speeds for two reasons: (1) to overcome mechanical drag forces that climb with velocity; (2) to overcome the back-emf that is generated by the motor as it spins faster.

The desired output voltage can be derived from the calculation of Equation 1.

Output voltage=[(ANGLE*C1)+(VELOCITY*C2)]+ C3     Equation 1:

Wherein, ANGLE is the angle of the surface the bicycle is being ridden on, VELOCITY is the linear speed of the bicycle, C1 is the gain applied to the ANGLE, C2 is the gain applied to the VELOCITY and C3 is an offset applied to the whole calculation.

In an embodiment C1, the gain applied to the angle, is 37, with the angle being represented in radians. C2, the gain applied to the velocity, is 0.42, with the velocity measured in msec. C3, the offset applied to the whole calculation, is 0.75 volts. It should be noted that varying embodiments may employ different gains C1, C2 and offset C3 and that the foregoing going is only an example of one of several possible embodiments.

In an embodiment, ANGLE is updated once per revolution of the wheel. The updating of ANGLE can be performed more or less frequently in accordance with differing embodiments.

In another embodiment, VELOCITY is updated N times per revolution of the wheel. The updating of VELOCITY can be performed more or less frequently in accordance with differing embodiments. In an embodiment, the value of N is 90. The frequency that VELOCITY is updated may vary greatly is accordance with varying embodiments.

In an embodiment, each time the VELOCITY is updated, data from the accelerometer 14 can be updated and stored in array within memory on main board 16. Each revolution of wheel assembly 10, the accelerometer data in the array can be read out and used to calculate the phase offset of the accelerometer.

Calculations can be accomplished using the processor 23 on main circuit board 16.

Data Sources:

The data for calculation of VELOCITY and ANGLE can be obtained from two sources: (1) the accelerometer 14; and (2) the two channel digital rotary encoder 18 having one part remaining stationary relative to axle 8, and another part that rotates with the wheel assembly 10.

Figure 4:
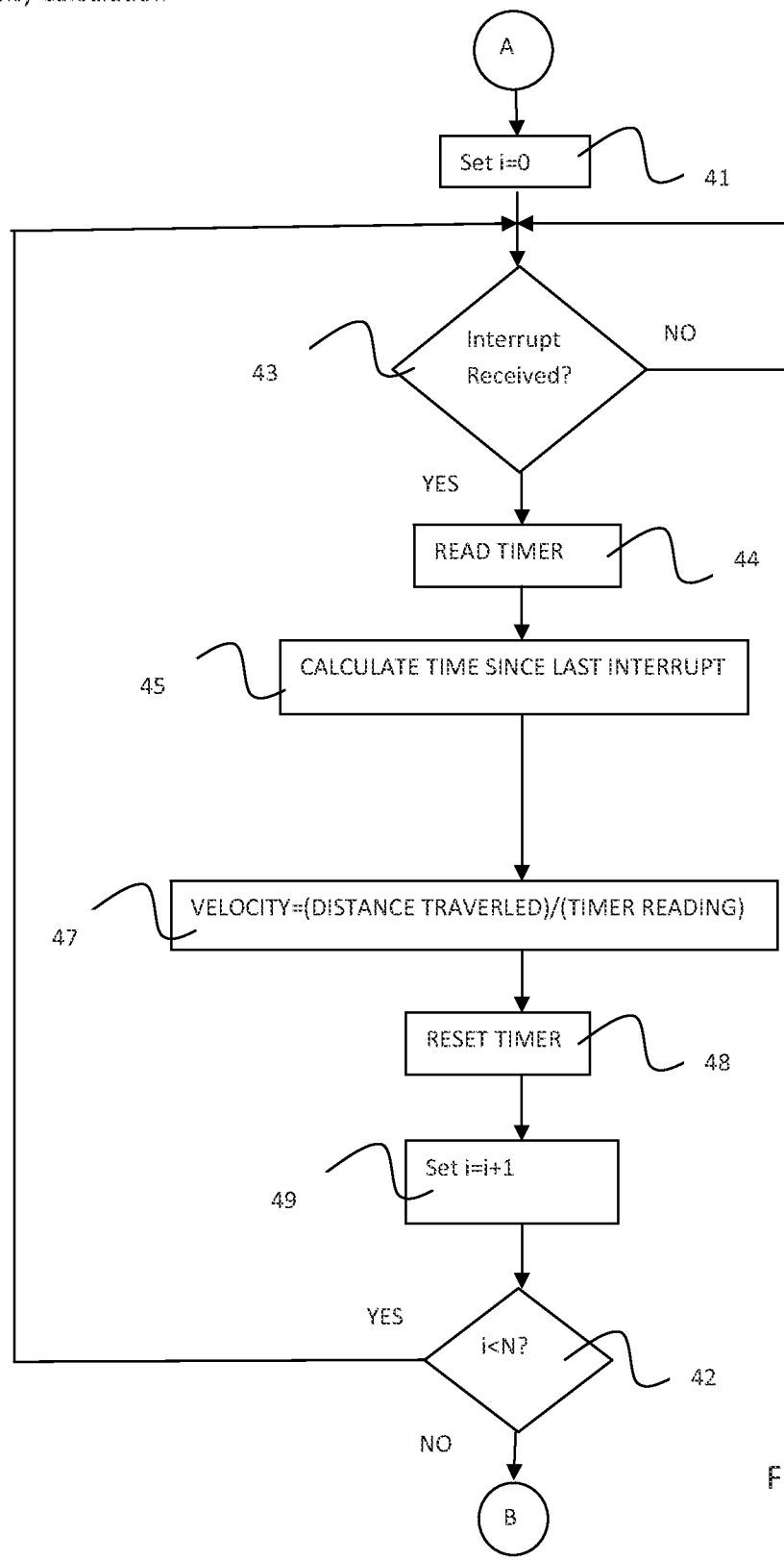
FIG. 4 is a flow chart for calculation of the velocity of electrical bicycle wheel in FIG. 1.

Calculation of VELOCITY:

FIG. 4 is a flow diagram for an embodiment that calculates the speed of wheel assembly 10. Set i=0 41 initializes an indexing variable. Interrupt received 43 waits for an interrupt to the processor on-board main circuit board 16. Encoder 18 generates quadrature pulses as the wheel assembly 10 rotates that are used to interrupt the processor on-board main circuit board 16. Encoder 18 generates quadrature pulses N times per revolution of wheel assembly 10. Therefore, the processor on-board main circuit board 16 is interrupted N times per revolution by pulses form the encoder 18, each interrupt triggering an interrupt service routines (ISR). In an embodiment N is 90; however, this number may be varied greatly in accordance with varying embodiments.

Each time the ISR is triggered, READ TIMER 43 reads the value of a timer on main circuit board 16. CALCULATE TIME SINCE LAST INTERRUPT 45 stores the timer value which is the time since the last interrupt. The distance calculated since the last interrupt is a known value that remains constant between encoder pulses. Using the timer reading and the known distance VELOCITY=(DISTANCE TRAVELED)/TIMER READING 47 distance by performs the relationship shown in Equation 2:

VELOCITY=distance traveled between encoder pulses/timer counts     Equation 2:

Each time encoder 18 provides pulses that interrupt the process on main circuit board 16 occurs, the amount of time since the last pulse from encoder 18 is known (since the last interrupt). In an embodiment, the timer can have a resolution of 100,000 counts per second. Other embodiments will have differing timer resolutions, either more counts per second or fewer counts per second. Implicit in each encoder pulse is that a certain distance has been covered between each pulse. This distance is a constant, making calculation of VELOCITY a simple task.

Once VELOCITY is calculated, RESET TIMER 48 resets the timer to 0. Set i=i+1 increments the indexing variable i that counts of to the value of N. Once i=N, i<N 42 exists the routine of FIG. 4 because a complete revolution of wheel assembly 16 has been completed and the VELOCITY of the wheel assembly 10 calculated.

The VELOCITY dependent portion of the output voltage is thus updated.

In an embodiment, FIG. 4 is not exited but again returns to entry point A and begins velocity calculations for the next revolution of wheel assembly 10.

Calculation of ANGLE:

In an embodiment, the ANGLE calculation is derived from multiple data sources. These data sources can be a rotary encoder and/or an accelerometer.

In an embodiment, the ANGLE calculation is updated one time per revolution of the wheel. Accordingly, in such an embodiment, the data acquisition and calculations described below with reference to FIG. 5 will work in parallel with the data acquisition and calculations described above in reference to FIG. 4.

In an embodiment, the ANGLE calculation is accomplished in two parts: In Part 1 of the ANGLE calculation, the accelerometer 14 rotates with the wheel assembly 10. Therefore, if the bicycle is rolling at a constant speed on a smooth surface, gravity causes the output of the accelerometer 14 to be a sine wave. Analog to Digital (A/D) conversions are performed on the signal from the accelerometer N times per revolution. These values are stored in memory on main circuit board 16 as an array or linked list. At the completion of a revolution, the data from the accelerometer 14 are stored in memory is used to calculate the phase offset of the signal.

Figure 5:
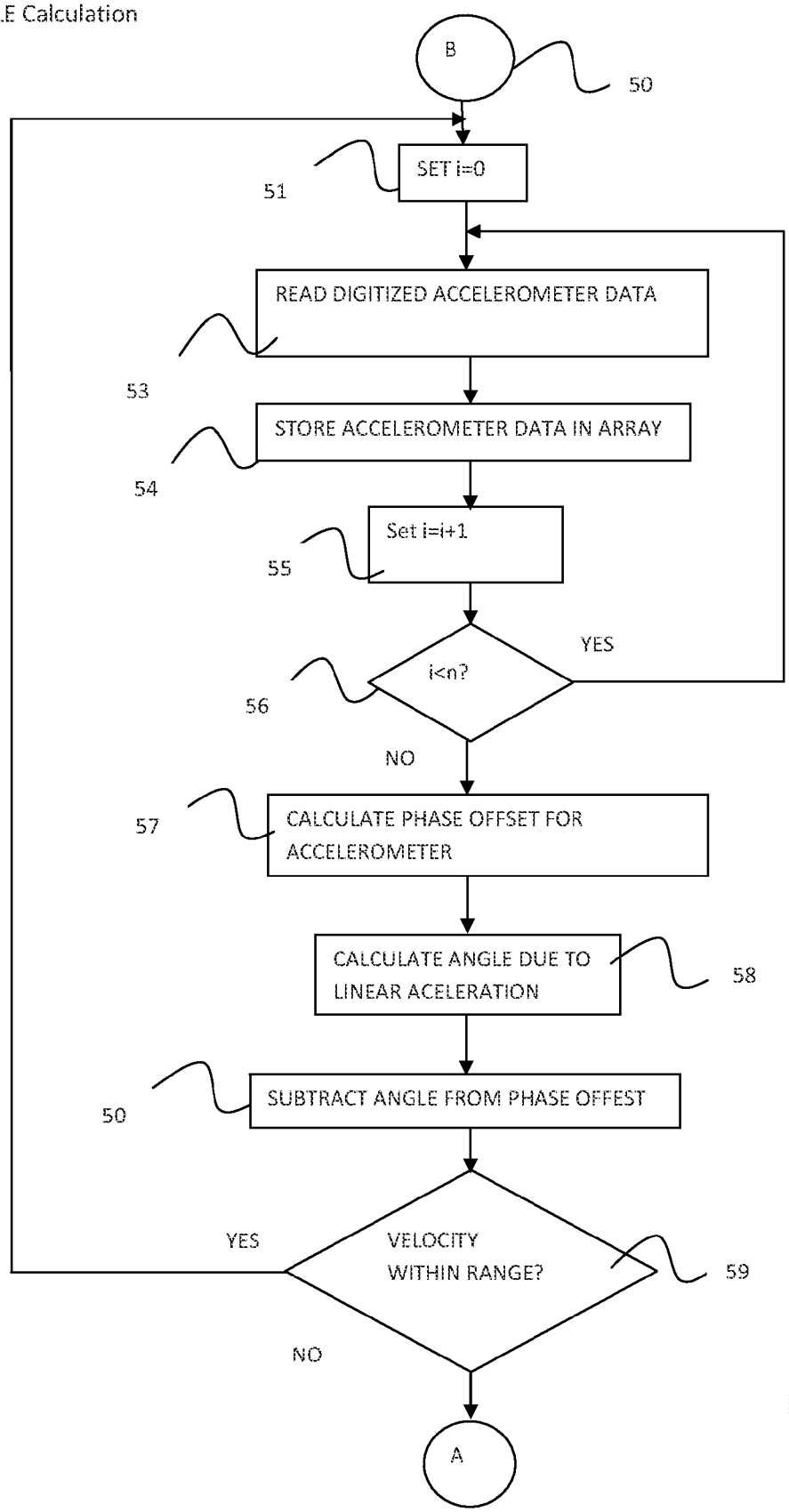
FIG. 5 is a flow chart for the calculation of the angle of the electrical bicycle wheel shown in FIG. 1.

Referring to FIG. 5, the angle calculation routine performed by the processor on the main circuit board 16 has entry point B. As discussed above in reference to FIG. 4, SET i=0 initializes an indexing variable that is used to index the reading of sensor data. READ DIGITIZED ACCELEROMETER DATA 53 acquires sensor data from accelerometer 14. STORE ACCELEROMETER DATA IN ARRAY 54 places the acquired sensor data from accelerometer 14 into memory on main circuit board 16 such that it can be accessed as an array. It should be noted that a linked list of each iteration of the accelerometer data stored read can be created in place of an array. Additionally, any data structure that allows the access to the iterations of accelerometer data stored in memory can be used. Set i=i+1 55 increments the indexing variable i. The decision block i<n 56 checks the value of indexing variable i. The routine in FIG. 5 will branch back loop back to READ DIGITIZED ACCELEROMETER DATA 53 SENSOR until the indexing variable i becomes equal to N.

In an embodiment, the loop described above is performed in parallel with the velocity calculation described in reference to FIG. 4. Each pulses from encoder 18 interrupt the processor on main circuit board 16, the accelerometer data is acquired and stored into an array. This continues through an entire revolution of wheel assembly 10 and then begins again. At the completion of a revolution, the data from the accelerometer 14 are stored in memory is used to calculate the phase offset of the signal. At the completion of a revolution, the data from the accelerometer 14 that has been stored in memory is used to calculate the phase offset of the signal.

In an embodiment, a MatLab implementation is used for the calculation of the phase offset signal from the stored accelerometer data. This MatLab implementation is shown below.

Matlab Implementation of the Angle Calculation function[ang1,ang2]=angle_calc($y1,N$)

% Given one input signal, y1 will return phase offset of the signal
% assuming y1 is primarily 1 Hz over N samples.

% $y1$ is pendulum signal=$A1*\cos(2*pi*x+ang1)$;

% $N=90$;

$x=(0:N-1)/N$;

basis_pendulum_cos($x$)=$\cos(2*pi*x)$;

basis_pendulum_sin($x$)=$\sin(2*pi*x)$;

$a1=0$;

$b1=0$;

for i=1:N, $a1=a1+y1(i)*$basis_pendulum_cos($i$);

$b1=b1+y1(i)*$basis_pendulum_sin($i$);

end $a1=a1/N$;

$b1=b1/N$;

$a2=a2/N$;

$b2=b2/N$;

$A1=2*\mathrm{sqrt}(a1^2+b1^2)$;

ang1=$a\tan 2(-b1,a1)$.

In another embodiment, the calculation performed in the MatLab implementation above is performed by a Fast Fourier Transform (FFT). The FFT can be written in a version of C++, or other high level program to perform the same mathematical computations performed by the foregoing MatLab implementation.

In Part 2 of the ANGLE calculation, accelerometer 14 is employed to sense all acceleration forces, not just gravity. Linear acceleration of the bicycle also forms a component of the total acceleration that the accelerometer measures. In this application, the portion of the angle that is due to linear acceleration of the bicycle is not a desired component. To compensate for this, the linear average linear acceleration is calculated from velocity data in accordance with the relationship of Equation 3:

Referring to FIG. 5, CALCULATE PHASE OFFSET FOR ACCELEROMETER 57 IS PERFORMED AT THE END OF A REVOLUTION either using an FFT, MetLab implementation or other programming solution.

CALCULATE ANGLE DUE TO LINEAR ACCELERATION 58 performs the calculations described below. First an average linear calculation is made according to equation 3:

Average linear acceleration=[(velocity at the end of the revolution)−(velocity at the start of the revolution)]/(time revolution takes to occur)  Equation 3:

The result from Equation 3 is multiplied by a constant to put it in gravitational units (G's) of 9.81 m/s$^2$.

The portion of the angle due to linear acceleration is then calculated according to the relationship of Equation 4:

Apparent_angle=a tan(average linear acceleration)  Equation 4:

SUBTRACT ANGLE FROM PHASE OFFSET 59 subtract The Apparent_angle from the angle calculated in Part 1, resulting in the angle that is used to calculate output voltage.

In an embodiment, if the final calculated angle is outside of the range of +/−7 degrees, it is clipped to +/−7 degrees using logic implemented within the system software that performs the following:

```
If (angle > 7 degrees)
{
Angle = 7 degrees
}
If (angle < −7 degrees)
{
Angle = − 7 degrees
}
```

Further Calculations:

To reduce the affect of noise sources, a running average is used for the angle calculation as shown by the following relationship of Equation 4:

Angle applied for this revolution=Average of the angles calculated for the previous $n$ revolutions
(The optimal value of $n$ is still being determined.
But as of this writing, $n$=4)  Equation 4:

A linear interpolation is performed between the previous angle and the current angle, resulting in an entire revolution to change between the two angles. This insures that there are no abrupt changes in voltage at wheel rotation boundaries.

An example of the interpolation:

Assume that the new angle has been calculated as described above, and the previous angle is also known.

Assume the following values:
angle (rev n−1)=1 degree
angle (rev n)=2 degrees
Assume each rev is broken up into 90 steps
At each step, 1/90th of the difference in angle is applied to the wheel. In our example, the difference in angle is 2 degrees−1 degree=1 degree. 1/90th of 1 degree=0.0111

TABLE 1

| interrupt number | applied angle |
|---|---|
| 1 | 1 |
| 2 | 1.0111 |
| 3 | 1.0222 |
| 4 | 1.0333 |
| ... | ... |
| 87 | 1.9667 |
| 88 | 1.9778 |
| 89 | 1.9889 |
| 90 | 2.000 |

As shown in Table 1, an entire revolution of the wheel is used to apply the angle change, avoiding abrupt changes in voltage to the motor.

The foregoing describes embodiment of the invention for illustrative purposes. These embodiments should not be viewed as being limiting and the breadth of the invention should be measured by the appended claims.

The invention claimed is:

1. A wheel assembly comprising:
   a motor attached to an axle within said wheel assembly;
   a battery system within said wheel assembly that is configured to deliver power to said motor;
   a sensor system within said wheel assembly that provides data related to velocity and angle of orientation of said wheel assembly; and
   a control system within said wheel assembly configured to receive the data related to velocity and angle of orientation, said control-system having at least one processor configured to calculate an output voltage based on the data related to velocity and angle of orientation, said control system generating an output and providing it to said battery system to alter a power delivered to said motor by the battery system
   wherein said sensor system further comprises an accelerometer to provide analog data related to angle of orientation of said wheel assembly.

2. The wheel assembly of claim 1 wherein said output of said control system controls said amount of power delivered to said motor without any user input.

3. The wheel assembly of claim 1 wherein said control system further comprises:
   at least one analog to digital converter that receives analog data related to velocity and angle of orientation for said wheel assembly from said sensor system and converts the analog data related to velocity and angle of orientation for said wheel assembly into digital data related to velocity and angle of orientation for said wheel assembly;
   an algorithm that receives digital data related to velocity and angle of orientation from said wheel assembly, said algorithm comprising:
   a first function for determining angle of orientation for said wheel assembly;
   a second function for determining velocity of said wheel assembly;
   a determination of output voltage applied to said motor via said output to said battery system, said determination performed according to:
   OUTPUT VOLTAGE=ANGLE*C1+VELOCITY*C2+C3 wherein, ANGLE is the angle of orientation for said wheel assembly;
   VELOCITY is the velocity of said wheel assembly; C1 is gain applied to ANGLE, C2 is gain applied to VELOCITY and C3 is a voltage offset; and
   a control device associated said battery system, said control device receiving said determination and applying said determination of OUTPUT VOLTAGE to said battery system.

4. The wheel assembly of claim 3 wherein said control system further comprises a Fast Fourier Transform (FFT) of digital data related to velocity and angle of orientation for said wheel assembly, said FFT of digital data related to velocity and angle of orientation for said wheel assembly being stored in a pair of Look Up Tables (LUTs) and the determination of OUTPUT VOLTAGE is made by subtracting the stored FFT related to velocity from the stored FFT related to the angle of orientation for said wheel assembly.

5. The wheel assembly of claim 4 wherein the stored FFT related to velocity and the stored FFT related to angle of orientation for said wheel assembly selected in the determination of OUTPUT VOLTAGE is made by sensor data.

6. The wheel assembly of claim 5 wherein said first function for determining angle of orientation for said wheel assembly and said second function for determining velocity of said wheel assembly are performed in parallel.

7. The wheel assembly of claim 1 wherein said sensor system further comprises a rotary encoder to provide analog data related to velocity.

8. The wheel assembly of claim 1 wherein said sensor system further comprises at least one strain gage.

9. The wheel assembly of claim 8 wherein said strain gage provides an initial determination of orientation of said wheel assembly.

10. A wheel assembly comprising:
    a motor attached to an axle within said wheel assembly such that said motor powers said wheel assembly to rotate about said axle once said motor receives a predetermined amount of power;
    a battery system within said wheel assembly that is configured to deliver power to said motor, said battery system arranged to rotate with said wheel assembly;
    a sensor system within said wheel assembly that provides data related to velocity and angle of orientation of said wheel assembly; and
    a control system within said wheel assembly configured to receive the data related to velocity and angle of orientation, said control-system having at least one processor configured to calculate an output voltage based on the data related to velocity and angle of orientation, said control system generating an output and providing it to said battery system to alter a power delivered to said motor by the battery system
    wherein said sensor system further comprises an accelerometer to provide analog data related to angle of orientation of said wheel assembly.

11. The wheel assembly of claim 10 wherein said output of said control system controls said amount of power delivered from said battery system to said motor in response to inputs from said sensor system.

12. The wheel assembly of claim 11 wherein said control system further comprises:
    at least one analog to digital converter that receives analog data related to velocity and angle of orientation for said wheel assembly from said sensor system and converts the analog data related to velocity and angle of orientation from said wheel assembly into digital data related to velocity and angle of orientation for said wheel assembly;
    an algorithm that receives digital data related to velocity and angle of orientation for said wheel assembly, said algorithm comprising:
    a first function for determining angle of orientation for said wheel assembly;
    a second function for determining velocity of said wheel assembly;
    a determination of output voltage applied to said motor via said output to said battery system, said determination performed according to:
    OUTPUT VOLTAGE=ANGLE*C1+VELOCITY*C2+C3 wherein ANGLE is the angle of orientation for said wheel assembly;
    VELOCITY is the velocity of said wheel assembly; C1 is gain applied to ANGLE, C2 is gain applied to VELOCITY and C3 is a voltage offset, and a control device associated said battery system, said control device receiving said determination and applying said determination of OUTPUT VOLTAGE to said battery system.

13. The wheel assembly of claim 12 wherein said control system further comprises a Fast Fourier Transform (FFT) of digital data related to velocity and angle of orientation for said wheel assembly, said FFT of digital data related to velocity and angle of orientation for said wheel assembly being stored in a pair of Look Up Tables (LUTs) and the determination of OUTPUT VOLTAGE is made by subtracting the stored FFT related to velocity from the stored FFT related to the angle of orientation for said wheel assembly.

14. The wheel assembly of claim 13 wherein the stored FFT related to velocity and the stored FFT related to the angle of orientation for said wheel assembly selected in the determination of OUTPUT VOLTAGE is made by sensor data.

15. The wheel assembly of claim 14 wherein said first function for determining angle of orientation for said wheel assembly is performed every revolution of said wheel assembly and said function for determining velocity of said wheel assembly is performed in parallel with said first function.

16. The wheel assembly of claim 15 wherein said sensor system further comprises a rotary encoder to provide analog data related to velocity that interrupting a system processor to update velocity data.

17. The wheel assembly of claim 16 wherein said sensor system further comprises at least one strain gage.

18. The wheel assembly of claim 17 wherein said strain gage provides an initial determination of orientation of said wheel assembly.

* * * * *